(12) United States Patent
Lee (10) Patent No.: US 6,593,675 B2
(45) Date of Patent: Jul. 15, 2003

(54) VIBRATION MOTOR

(75) Inventor: In Ho Lee, Suwon (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/963,212

(22) Filed: Sep. 25, 2001

(65) Prior Publication Data

US 2003/0015929 A1 Jan. 23, 2003

(30) Foreign Application Priority Data

Jul. 18, 2001 (KR) ........................................ 2001-43014

(51) Int. Cl.[7] ................................................ H02K 5/00
(52) U.S. Cl. .......................................... 310/91; 310/81
(58) Field of Search ........................ 310/81, 91, 67 R; 411/526–527, 533, 520, 521, 437, 519

(56) References Cited

U.S. PATENT DOCUMENTS

| 746,006 A | * | 12/1903 | Brigham ...................... 411/533 |
| 3,694,013 A | * | 9/1972 | Heitner ......................... 411/971 |
| 5,707,192 A | * | 1/1998 | Vortriede et al. ............ 411/526 |
| 5,803,692 A | * | 9/1998 | Postadan ...................... 411/526 |
| 5,833,422 A | * | 11/1998 | Haga et al. .................. 411/526 |
| 6,368,319 B1 | * | 4/2002 | Schaefer ....................... 411/519 |

* cited by examiner

Primary Examiner—Tran Nguyen
(74) Attorney, Agent, or Firm—Darby & Darby (57) ABSTRACT

Disclosed is a vibration motor. The vibration motor comprises: a cover plate for fixedly receiving the lower end of a shaft in a central part; a housing coupled with the cover plate to define a certain size of space and having a recess in an upper inner central part; a lower board attached to the upper surface of the cover plate and having brushes projected at one end; magnets attached to the upper surface of the cover plate; an upper board rotationally supported while being eccentric by the shaft and having commutators made of a number of segments in the bottom for electric connection with the brushes; a plurality of winding coils distanced from each other at an angle in the upper surface of the upper board; an insulator made of a resin for fixing the plurality of winding coils to the upper board; and support means made of an elastic material, the support means being attached while covering the recess of the housing and having incisions for being spread toward the recess to center the shaft when the upper end of the shaft is press fit into a central part of the incisions. The shaft can be correctly fixed in the central position by the incisions in the support means so that an eccentric rotor can maintain stable operation features thereby greatly enhancing reliability of articles.

12 Claims, 6 Drawing Sheets

FIG. 1

(CONVENTIONAL ART)

FIG. 2

(CONVENTIONAL ART)

VIBRATION MOTOR

BACKGROUND OF THE INVENTION

1. Field of the Invention

The present invention relates generally to a vibration motor installed in a mobile terminal as call incoming means together with a bell, and more particularly, to a vibration motor which is fixed through the press fit by a shaft thereby enabling the axis with precise erectness while eliminating malfunctions due to a mechanical assembly error.

2. Description of the Prior Art

In general, one of essential functions in communication instruments is a call incoming function, which is mostly provided in a sound mode such as melody or bell and a vibration mode vibrating a communication instrument.

In other words, when a user previously selected a call incoming function, the selected function is operated at the time of call incoming so that the user can notice the call incoming.

In such call incoming modes, in particular, the vibration mode is generally used in a place where a number of people are gathered so as not to interrupt others.

In the sound mode such as melody or bell of the call incoming function, a number of melody or bell types are previously stored in the instrument to be outwardly transmitted through a small sized speaker allowing the user to notice the call incoming. In the vibration mode, generally a small sized vibration motor is operated to transfer a vibration force to a housing of the instrument so that the instrument can be vibrated.

Figure 1:
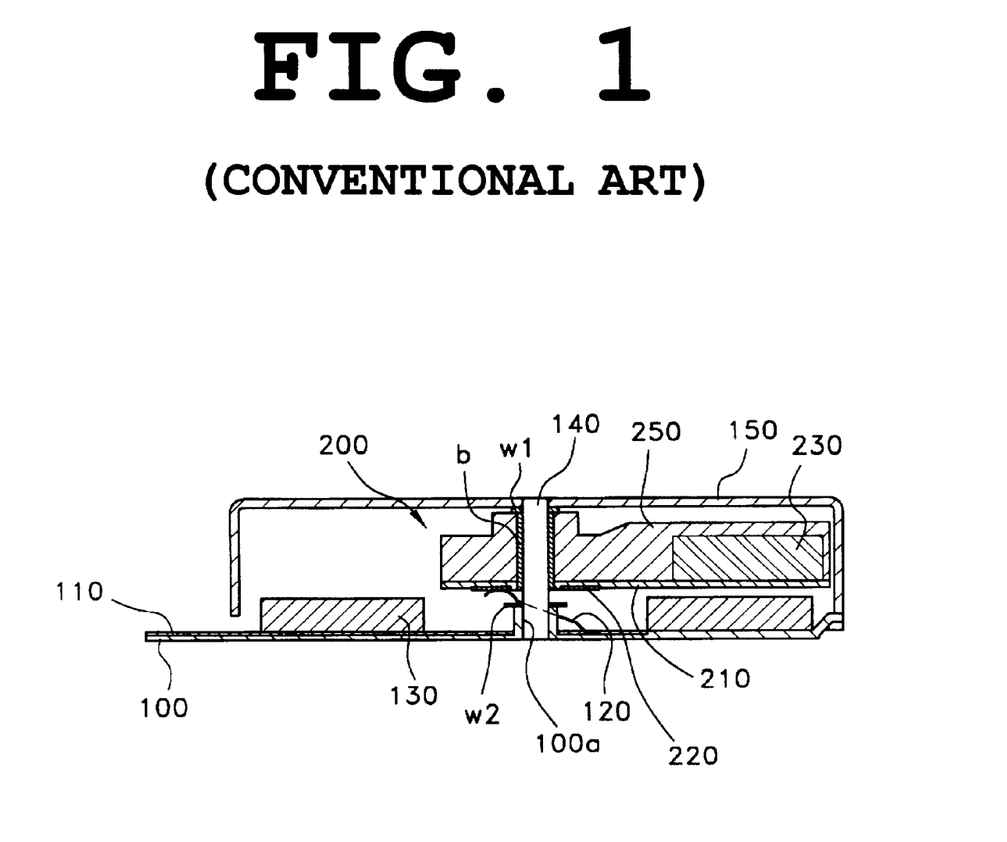
FIG. 1 is a sectional view of a vibration motor of the prior art.
Figure 2:
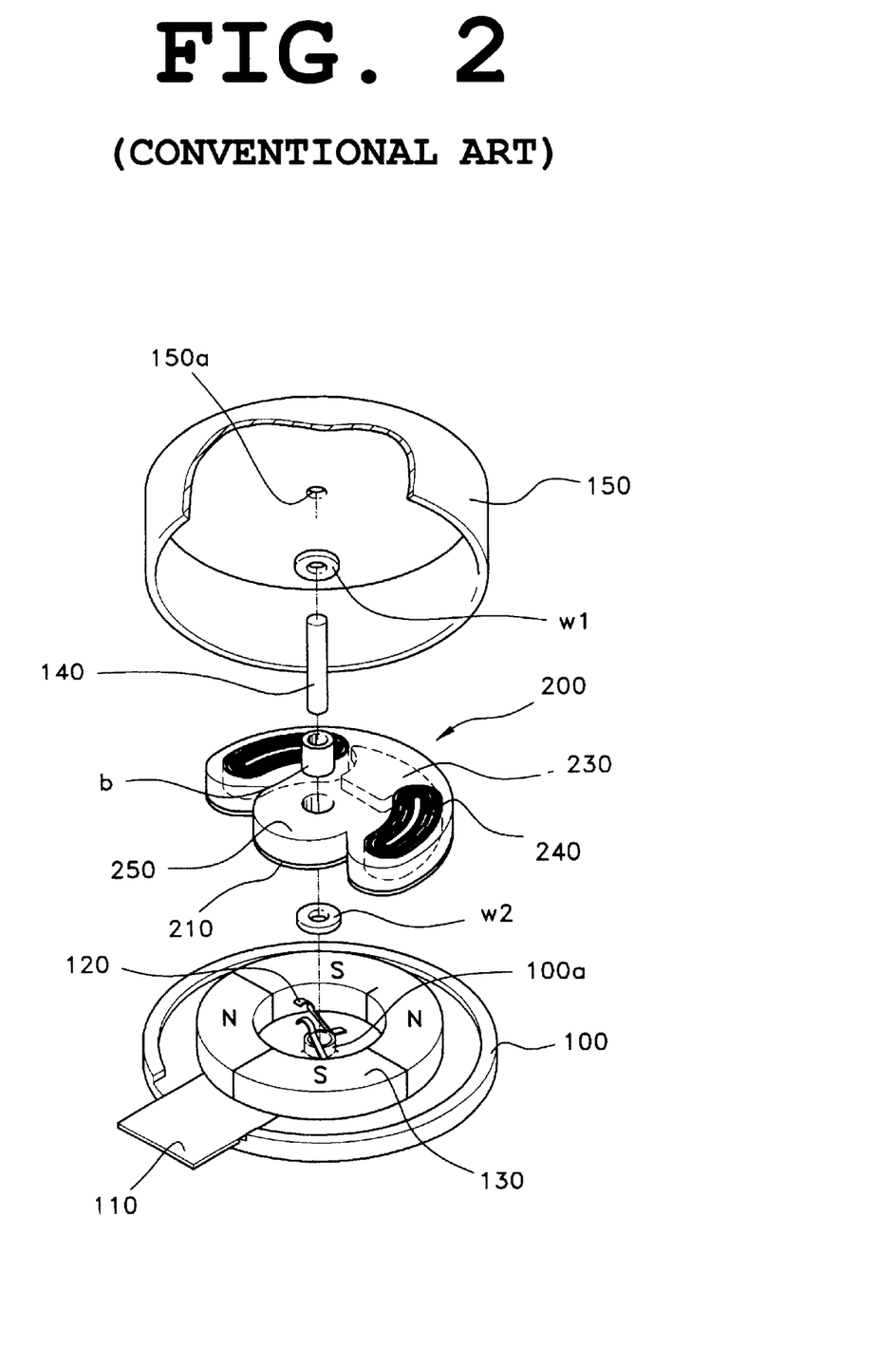
FIG. 2 is an exploded perspective view of the vibration motor shown in FIG. 1.

Meanwhile, the vibration mode of the prior art is obtained by using a vibration motor installed in the instrument. As shown in FIG. 1 and FIG. 2, one of the most typical vibration motors, so-called "pan cake" or "coin type" motor, has the outer shape with the diameter relatively larger than the thickness.

Such a vibration motor has a plate-type cover plate 100 in the bottom. The cover plate 100 has a tubular burring part 100a in the center. The tubular burring part 100a has an axial hole in the center projected at a certain height so that the lower end of a shaft 140 can be fixedly press fit into the axial hole. Also, in the upper surface of the cover plate 100 is a lower board 110 with a printed circuit which enables external power application.

At the upper surface of the cover plate 100 having the lower board 110 like this are arranged magnets 130 in the annular shape having a vertical through-hole defined in the center of the magnets 130 and N and S poles arranged alternately with the equal gap at the round periphery thereof.

The lower board 110 in the bottom of a central space of the magnets 130 is spaced from a pair of brushes 120 with one ends respectively connected to input and output ends of the magnets 130 and the other ends positioned higher than the upper surfaces of the magnets 130.

Meanwhile, a cylindrical housing 150 is coupled with the cover plate 100 the end of outer periphery thereof to cover the cover plate 100. The housing 150 has a shaft hole 150a in the upper center for receiving the shaft 140 while supporting the same.

In this manner, the shaft 140, the lower board 110, the magnets 130 and the pair of brushes 120 supported by the cover plate 100 define a stator. In respect to the stator is rotationally arranged an eccentric rotor 200 comprising an upper board 210, commutators 220 and winding coils 240.

Here, the upper board 210 is a typical printed circuit board which is made of a plate-type member cut at an arbitrary angle, and supported by the shaft 140 and a bearing b so that the upper board 210 can be eccentrically rotated. Such an upper board 210, in the bottom opposed to the cover plate 100, is integrally provided with the commutators 220 comprising a number of segments. The segments of the commutators 220 contact with the upper ends of a pair of brushes 120 with the lower ends connected to the lower board 110.

The winding coils 240 are attached to the upper surface of the upper board 210 without a printed circuit, and are composed of at least one coil according to an operation mode of the vibration motor. In particular, when the winding coils 240 are made of the plurality of coils, the coils are spaced at a predetermined angle from one another.

Also, the upper board 210, in the surface without the winding coil 240, is integrally provided with an insulator 250 for enhancing insulation and eccentric load between the winding coils 240 in the upper board 210. The insulator 250 is integrally formed through insert extrusion together with the commutators 220 and the winding coils 240 attached to the upper board 210 when the upper board 210 is made. The adjacent pair of winding coils 240 have a weight 230 made of a heavy metal such as tungsten in order to maximize the eccentric amount.

Meanwhile, the shaft 140 is in the peripheries of the upper and lower ends coupled into discal upper and lower washers w1 and w2 with through holes in the center thereof. When the eccentric rotor 200 is elevated or dropped in the operation of the motor, the upper and lower washers w1 and w2 directly contact with the housing 150 and the cover plate 100 to prevent destruction.

In the conventional vibration motor having the foregoing configuration, when an electric power is externally applied through the lower board 110, the electric power is induced to the commutators 220 through the brushes 120 with the lower ends connected to the lower board 110 and then supplied to the winding coils 240 through the printed circuit on the upper board 210 from the commutators 220 so that an electromagnetic force is generated from the interaction between magnetic fluxes from the winding coils 240 and the magnets 130 to rotate the eccentric rotor 200.

Here, the eccentric rotor 200 is eccentrically supported by the shaft 140 to exert an eccentric driving force, which is transferred to the cover plate 100 and the housing 150 through the shaft 140 to drive silent call-incoming means of a mobile communication terminal.

However, in the vibration motor of the prior art, while the lower end thereof is fixedly press fit into the cover plate 100, the upper end of the shaft 140 is simply inserted into the shaft hole 150a of the housing 150 so that the erectness of the shaft is unstable resultantly lowering the performance of the motor as a problem.

In other words, the shaft hole 150a has the inside diameter larger in respect to the outside diameter of the shaft to assemble the shaft 140 into the shaft hole 150a of the housing 150 so that a play, even if slight, is created between the shaft 140 and the shaft hole 150a when the shaft 140 is assembled into the shaft hole 150a. Therefore, the upper end of the shaft 140 is played within the shaft hole 150a due to side pressure to incur damage and noise according to inter-component contact in the operation of the motor. In particular, as the erectness of the shaft 140 becomes unstable, the operation features of the eccentric rotor 200 is also degraded causing problems such as reduced life time.

SUMMARY OF THE INVENTION

Accordingly, the present invention has been proposed to solve the foregoing problems and it is an object of the present invention to provide a vibration motor which can ensure the erectness of a shaft more precise while stably fixing one end of the shaft into a housing through press fit so that operation features and endurance can be enhanced.

It is another object of the present invention to enable absorptive damping of the impact in the operation of the eccentric motor to stably maintain the operation features of the motor.

According to an embodiment of the invention to obtain the foregoing object, it is provided a vibration motor comprising: a cover plate for fixedly receiving the lower end of a shaft in a central part; a housing coupled with the cover plate to define a certain size of space and having a recess in an upper inner central part; a lower board attached to the upper surface of the cover plate and having brushes projected at one end; magnets attached to the upper surface of the cover plate; an upper board rotationally supported while being eccentric by the shaft and having commutators made of a number of segments in the bottom for electric connection with the brushes; a plurality of winding coils distanced from each other at an angle in the upper surface of the upper board; an insulator made of a resin for fixing the plurality of winding coils to the upper board; and support means made of an elastic material, the support means being attached while covering the recess of the housing and having incisions for being spread toward the recess to center the shaft when the upper end of the shaft is press fit into a central part of the incisions.

Preferably, the incisions of the support means are radially incised about the center.

Also preferably, the incisions of the support means is sized smaller than the outside diameter of the shaft.

Preferably also, the incisions of the support means have the center coinciding with that of the shaft.

Also preferably, the support means has an adhesive coated with a height on the outer periphery of the incisions opposed to the recess of the housing.

According to another embodiment of the invention to obtain the foregoing object, it is provided a vibration motor comprising: a cover plate having a tubular burring part provided in an upper central part for fixedly receiving the lower end of a shaft; a housing coupled with the cover plate to define a certain size of space and having a recess in an upper inner central part; a lower board attached to the upper surface of the cover plate and having brushes projected at one end; magnets attached to the upper surface of the cover plate at the outside of the lower board; an upper board rotationally supported while being eccentric by the shaft and having commutators made of a number of segments in the bottom for electric connection with the brushes; a plurality of winding coils distanced from each other at an angle in the upper surface of the upper board; an insulator made of a resin for fixing the plurality of winding coils to the upper board; an upper washer made of an elastic material, the upper washer being attached while covering the recess of the housing and having incisions for being spread toward the recess when the upper end of the shaft is press fit into a central part of the incisions; and a lower washer coupled with the outer periphery of the shaft over the burring part.

Preferably, the incisions of the upper washer are radially incised about the center.

Also preferably, the incisions of the upper washer is sized smaller than the outside diameter of the shaft.

Preferably also, the incisions of the upper washer have the center coinciding with that of the shaft.

Also preferably, the upper washer has an adhesive coated with a height on the outer periphery of the incisions opposed to the recess of the housing.

DESCRIPTION OF THE PREFERRED EMBODIMENTS

Figure 3:
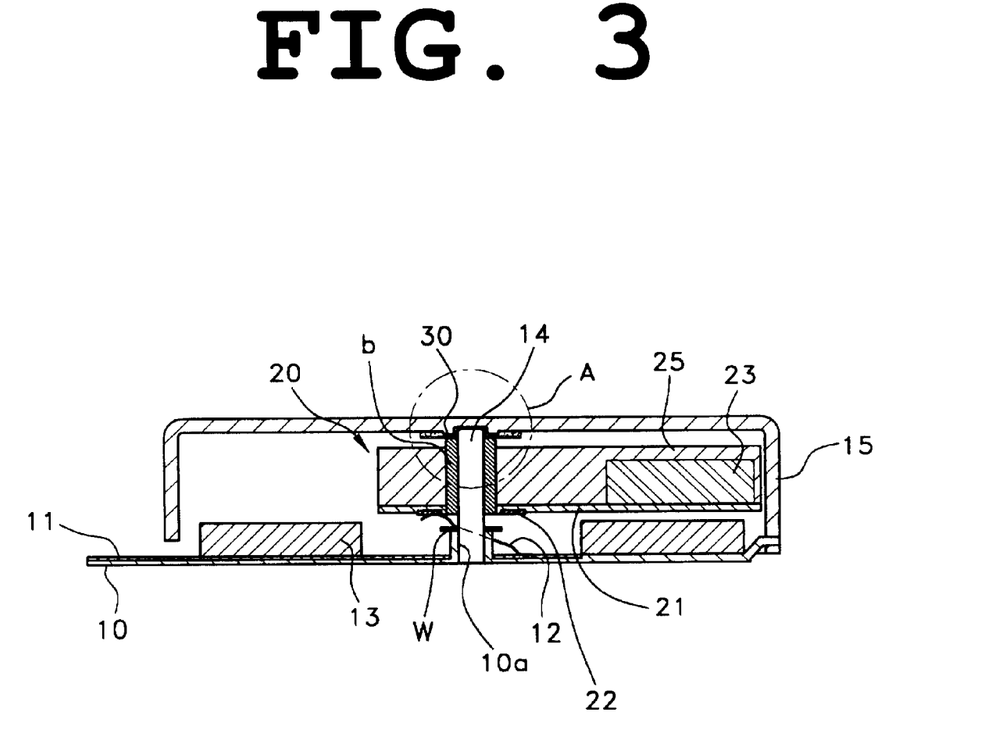
FIG. 3 is a sectional view of a vibration motor of the invention.
Figure 4:
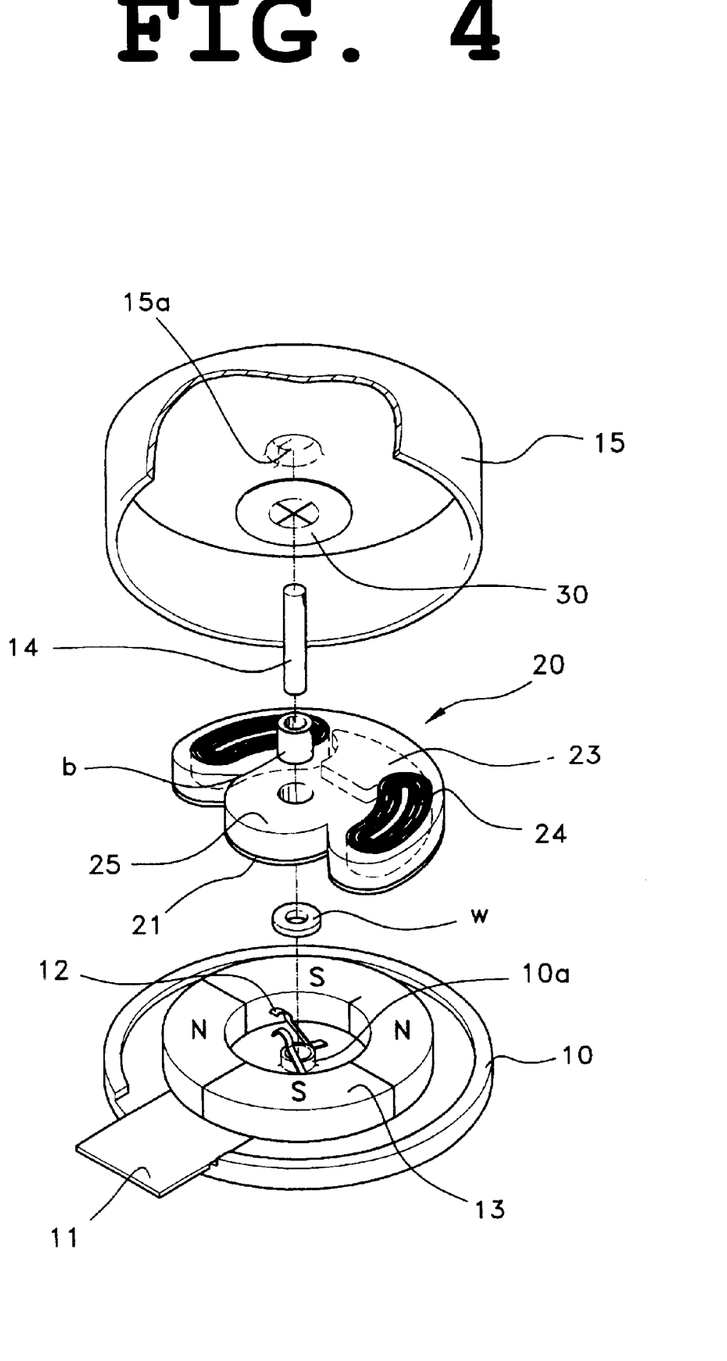
FIG. 4 is an exploded perspective view of the vibration motor shown in FIG. 3.

FIG. 3 is a sectional view of a vibration motor of the invention, and FIG. 4 is an exploded perspective view of the vibration motor shown in FIG. 3.

As shown in FIG. 3 and FIG. 4, the vibration motor of the invention has a cylindrical housing 15 with the open lower end which is coupled with a cover plate 10 to define a certain size of space therein for mounting various components.

The housing 15 is provided in the center of the lower surface with a certain size of recess 15a, the center of which is positioned on a vertical line coinciding with the axial center of a shaft 14 which will be described hereinafter.

The cover plate 10 is manufactured to have a corresponding shape for shielding the open lower surface of the housing 15, and has a tubular burring part 10a integrally provided in the upper center thereof. The lower end of the shaft 14 is press fit into the burring part 10a, a lower board 11 which can be externally powered and annular magnets 13 with alternately magnetized N and S poles are attached to the outer periphery of the burring part 10a, and a washer w is provided over the burring part 10a to prevent an eccentric rotor 20 from contacting with the cover plate 10 in the case of falling due to external impact and so on.

Also, at one side of an upper board 21 are arranged a pair of brushes 12 with the one ends higher than the upper surface of the magnets 13. The brushes 12 are externally powered and distanced from each other at a certain angle.

Meanwhile, the eccentric rotor 20 for generating vibration is rotationally arranged via a bearing b at the outer periphery of the shaft 14 for connecting the inner centers of the housing 15 and the cover plate 10. The eccentric motor 20 comprises the upper board 21 having commutators electrically connected with the brushes 12 in the bottom thereof; at least one winding coil 24 attached to the upper surface of the upper board 21 for interacting with the magnets 13, which are attached to the cover plate 10, to generate an electromagnetic force; a weight 23 arranged between the adjacent pair of winding coils 24 for maximizing vibration; an insulator 25 integrally formed together with the commutators, the winding coils 24 and the weight 23 through insert extrusion.

Such a configuration is same as that of the conventional vibration motor in generating vibration using the eccentric rotor.

However, the present invention is characterized in that the upper end of the shaft 14 is fixedly press fit into a central part of the housing 15 to ensure correct axial erectness, and in that support means 30 formed of an elastic material is provided to prevent the eccentric rotor 20 from contacting with the housing 15 due to floating force.

Figure 5:
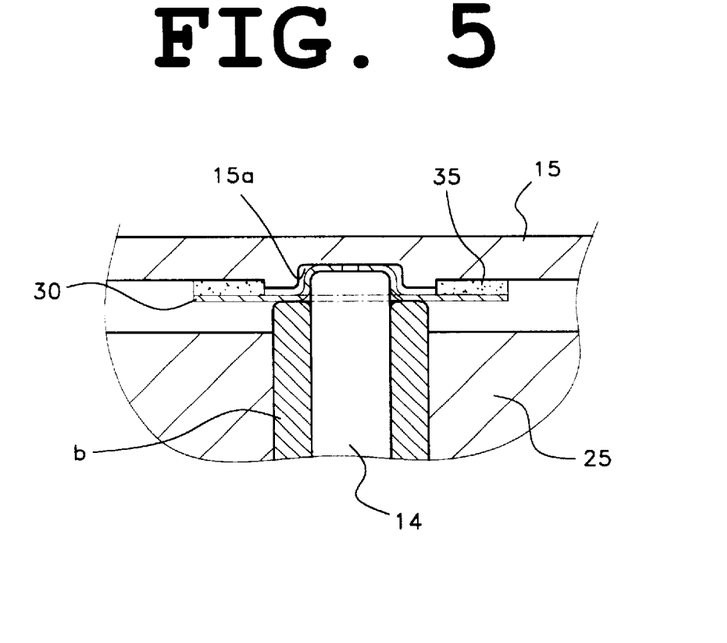
FIG. 5 is a magnified sectional view of "A" shown in FIG. 3.
Figure 6:
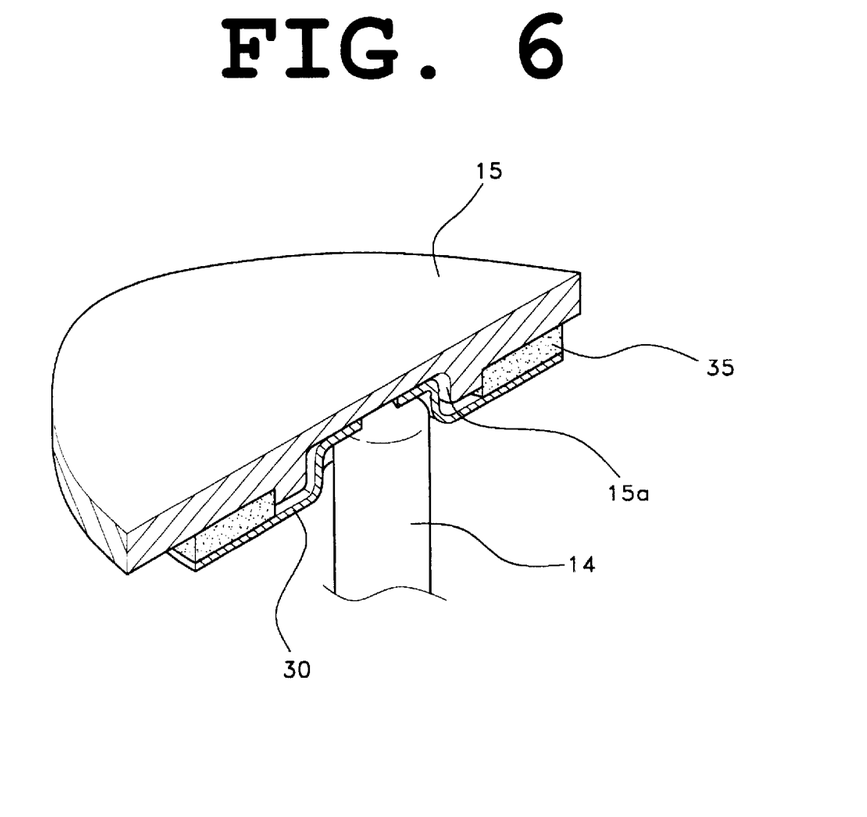
FIG. 6 is a partial dissected perspective view of FIG. 5.
Figure 7:
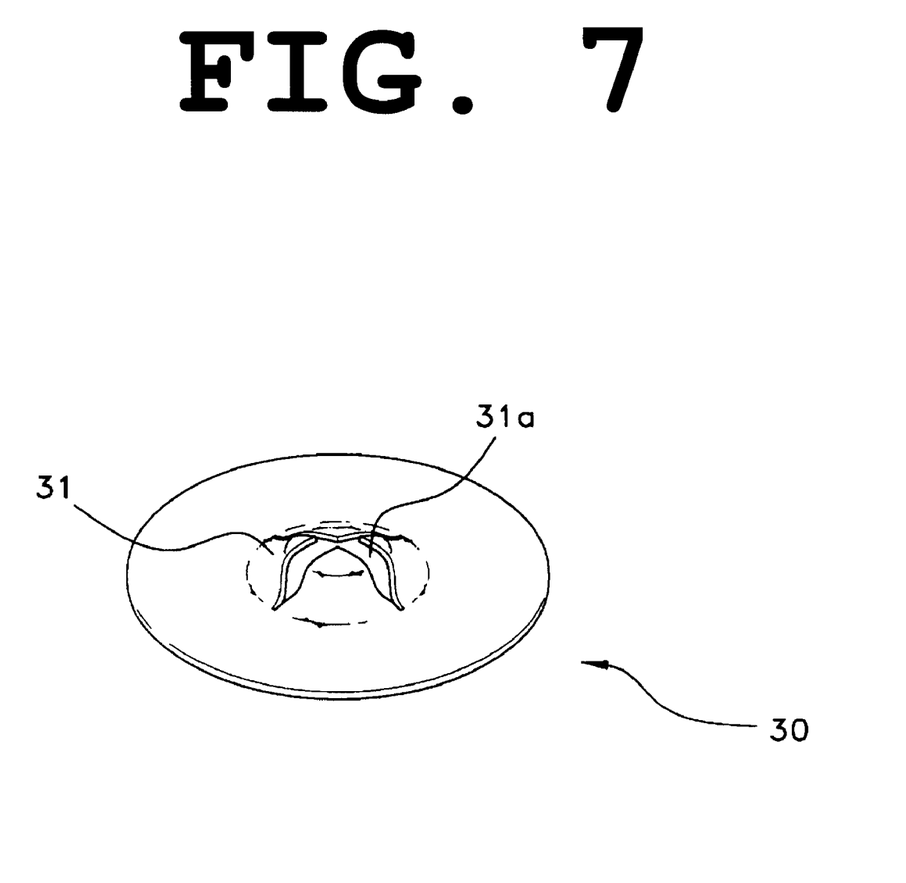
FIG. 7 is a perspective view of support means of the vibration motor of the invention.

As shown in FIG. 5 to FIG. 7, the support means 30 of the invention is adapted to cover a recess 15a formed in the central lower surface of the housing 15, and has incisions in a central part so that the upper end of the shaft 14 can be fixedly press fit.

The support means 30 is made elastic to prevent the contact between the shaft 14 and the housing 15 while absorbing the impact transferred to the shaft 14 in the operation of the eccentric rotor 20, and also stably support the outer periphery of the shaft 14 via the incisions for correct positioning in the center, thereby functioning to stably maintain the operational features of the motor.

Alternatively, the support means 30 can employ a washer with incisions in the center. The support means 30 are divided into a number of support pieces and outwardly spread by a force of the shaft, which is press fitting into the washer, to form a shaft hole 31a in the center thereby uniformly supporting the outer periphery of the shaft 14.

In other words, referring to the structure of the support means 30, the support means 30 is provided as a circular plate-type member as shown in FIG. 7, and has a bilateral tape attached thereto or an adhesive 35 coated at a certain height to be attached to the central lower surface of the housing 15 as shown in FIG. 6.

Also, the support means 30 is provided in the central surface with incisions, which are radially incised about the center on the same line as the axial center of the shaft 14 and have the inside diameter smaller, even if slightly, than the outside diameter of the shaft so that the shaft 14 can be press fit into the support means 30.

While the incisions of the foregoing configuration are incised in the shape of a cross to be divided into four support pieces 31 as shown in FIG. 7, the present invention is not restricted to this configuration and can have various configurations so that the incisions can be radially incised from the center of the support means 30 to be divided into a number of support pieces 31 when the shaft 14 is press fit into the incisions.

Meanwhile, the bilateral tape or adhesive 35 for fixing the support means 30 to the bottom of the housing 15 is preferably provided in the outer periphery of the incisions not to interrupt the assembly of the shaft 14.

While the support means 30 has a thickness smaller than a gap between the outer peripheral surface of the shaft 14 and the recess 15a of the housing 15, the thickness of the support means 30 together with the adhesive 35 is preferably larger than the gap between the shaft 14 and the housing 15. In this configuration, when the shaft 14 is press fit into the incisions, the support pieces 31 and the adhesive 35 are resultantly placed, while being compressed, in the gap between the shaft 14 and the housing 15 so as to have a structure for absorbing impact while sufficiently preventing flow due to dispersion between the shaft 14 and the housing 15.

In the vibration motor of the invention having the foregoing configuration, when an externally supplied power is applied through the brushes 12 and the commutators to the winding coil 24 provided in the eccentric rotor 20, the winding coils 24 and the magnets 13 attached to the cover plate 10 generate an electromagnetic force, which enables the eccentric rotor 20 to rotates about the shaft 14.

Here, the eccentric rotor 20 is driven as eccentrically supported by the shaft 14, such an eccentric driving force is outwardly transferred through the shaft 14 to vibrate an instrument in which the vibration motor is installed.

The operation of the support means in the vibration motor of the invention will be described as follows:

First, the lower end of the shaft 14 is press fit into the burring part 10a, which are projected from the upper central part of the cover plate 10, and the bearing b and the eccentric rotor 20 are assembled to the outer periphery of the shaft 14.

Then, the housing 15 is assembled to the upper side of the cover plate 10. Here, since the housing 15 is provided with the support means 30 for covering the recess 15a in the lower center, the upper end of the shaft 14 is correctly fixed into the central position.

In other words, the support means 30 has the incisions which are sized smaller compared to the outside diameter of the shaft 14 and are divided into the number of support pieces 31, when the upper end of the shaft 14 is press fit into the same, to be deformed in the advancing direction of the shaft 14 or toward the inner periphery of the recess 15a of the housing 15.

In particular, the force of the shaft 14 pressing fitting into the incisions uniformly spreads each of the support pieces 31, and as a result, each of the support pieces 31 uniformly contacts with the outer periphery of the shaft 14.

Therefore, when the shaft 14 is assembled to the incisions of the support means 30, each of the support pieces 31 is uniformly spread to support the outer periphery of the shaft 14 thereby enabling correct fixing in the central position.

Also, the support means 30 is made of the elastic material to stably maintain the axial erectness of the shaft 14 through the absorption and damping about the impact generated in driving the rotor 20.

According to the vibration motor of the invention, the axial center of the shaft can be fixed in the correct position through a simple fabrication process of press fitting the shaft into the incisions of the support means, and in particular, the support means is made of the elastic material to absorb and damp the impact generated in the operation of the eccentric motor so that the operation features of the motor can be stably maintained.

Also, the support means stably support the shaft while preventing the contact between the eccentric rotor and the housing to prevent damage due to component interference.

What is claimed is:

1. A vibration motor comprising:
    a cover plate for fixedly receiving the lower end of a shaft in a central part;
    a housing coupled with said cover plate to define a predetermined size of space and having a recess in an upper inner central part;
    a lower board attached to the upper surface of said cover plate and having brushes projected at one end;
    magnets attached to the upper surface of said cover plate;
    an upper board rotationally supported while being eccentric by said shaft and having commutators made of a number of segments in the bottom for electric connection with said brushes;
    a plurality of winding coils distanced from each other at an angle in the upper surface of said upper board;
    an insulator made of a resin for fixing said plurality of winding coils to said upper board; and
    support means made of an elastic material, said support means being attached while covering said recess of the housing, said support means having incisions for being spread toward said recess to center said shaft when the upper end of said shaft is press fitted into a central part of said incisions, said support means being interposed between said housing and said shaft to absorb impact generated in the operation of the motor.

2. The vibration motor according to claim 1, wherein said incisions of said support means are radially incised about the center.

3. The vibration motor according to claim 2, wherein said incisions of said support means have a center coinciding with that of said shaft.

4. The vibration motor according to claim 1, wherein said support means has an adhesive coated on an outer periphery of said incisions opposed to said recess of said housing.

5. The vibration motor according to claim 4 wherein said adhesive layer together with said support means have a thickness larger than a gap between the shaft and the housing.

6. A vibration motor comprising:
 a cover plate for fixedly receiving the lower end of a shaft in a central part;
 a housing coupled with said cover plate to define a predetermined size of space and having a recess in an upper inner central part;
 a lower board attached to the upper surface of said cover plate and having brushes projected at one end;
 magnets attached to the upper surface of said cover plate;
 an upper board rotationally supported while being eccentric by said shaft and having commutators made of a number of segments in the bottom for electric connection with said brushes;
 a plurality of winding coils distanced from each other at an angle in the upper surface of said upper board;
 an insulator made of a resin for fixing said plurality of winding coils to said upper board; and
 support means made of an elastic material, said support means being attached while covering said recess of the housing, said support means having incisions for being spread toward said recess to center said shaft when the upper end of said shaft is press fitted into a central part of said incisions;
 wherein said incisions of said support means are sized smaller than an outside diameter of said shaft.

7. A vibration motor comprising:
 a cover plate having a tubular burring part provided in an upper central part for fixedly receiving the lower end of a shaft;
 a housing coupled with said cover plate to define a predetermined size of space and having a recess in an upper inner central part;
 a lower board attached to the upper surface of said cover plate and having brushes projected at one end;
 magnets attached to the upper surface of said cover plate at the outside of said lower board;
 an upper board rotationally supported while being eccentric by said shaft and having commutators made of a number of segments in the bottom for electric connection with said brushes;
 a plurality of winding coils distanced from each other at an angle in the upper surface of said upper board;
 an insulator made of a resin for fixing said plurality of winding coils to said upper board;
 an upper washer made of an elastic material, said upper washer being attached while covering said recess of the housing, said upper washer having incisions for being spread toward said recess when the upper end of said shaft is press fitted into a central part of said incisions, said upper washer being interposed between said housing and said shaft to absorb impact generated in the operation of the motor; and
 a lower washer coupled with the outer periphery of said shaft over said burring part.

8. The vibration motor according to claim 7, wherein said incisions of said upper washer are radially incised about a center.

9. The vibration motor according to claim 8, wherein said incisions of said upper washer have a center coincident with that of said shaft.

10. The vibration motor according to claim 7, wherein said upper washer has an adhesive coated on an outer periphery of said incisions opposed to said recess of said housing.

11. The vibration motor according to claim 10 wherein said adhesive layer together with said upper washer have a thickness larger than a gap between the shaft and the housing.

12. A vibration motor comprising:
 a cover plate for fixedly receiving the lower end of a shaft in a central part;
 a housing coupled with said cover plate to define a predetermined size of space and having a recess in an upper inner central part;
 a lower board attached to the upper surface of said cover plate and having brushes projected at one end;
 magnets attached to the upper surface of said cover plate;
 an upper board rotationally supported while being eccentric by said shaft and having commutators made of a number of segments in the bottom for electric connection with said brushes;
 a plurality of winding coils distanced from each other at an angle in the upper surface of said upper board;
 an insulator made of a resin for fixing said plurality of winding coils to said upper board; and
 support means made of an elastic material, said support means being attached while covering said recess of the housing, said support means having incisions for being spread toward said recess to center said shaft when the upper end of said shaft is press fitted into a central part of said incisions;
 wherein said incisions of said support means are sized smaller than an outside diameter of said shaft.

* * * * *